(12) United States Patent
Tzadikevitch et al.

(10) Patent No.: US 11,610,166 B2
(45) Date of Patent: Mar. 21, 2023

(54) HIERARCHICAL SERVICE TREES

(71) Applicant: Hewlett Packard Enterprise Development LP, Houston, TX (US)

(72) Inventors: Gil Tzadikevitch, Yehud (IL); Ran Biron, Yehud (IL); Oded Zilinsky, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 1927 days.

(21) Appl. No.: 15/032,583

(22) PCT Filed: Oct. 29, 2013

(86) PCT No.: PCT/US2013/067199
§ 371 (c)(1),
(2) Date: Apr. 27, 2016

(87) PCT Pub. No.: WO2015/065326
PCT Pub. Date: May 7, 2015

(65) Prior Publication Data
US 2016/0253613 A1 Sep. 1, 2016

(51) Int. Cl.
*G06Q 10/06* (2012.01)
*H04L 41/5041* (2022.01)
*G06Q 10/0631* (2023.01)

(52) U.S. Cl.
CPC ....... *G06Q 10/06316* (2013.01); *G06Q 10/06* (2013.01); *H04L 41/5041* (2013.01)

(58) Field of Classification Search
CPC .............. G06F 11/0709; G06F 9/5061; G06F 11/3447; G06F 11/3495; G06F 8/35; G06Q 10/06313; G06Q 10/06; G04L 41/5041
See application file for complete search history.

(56) References Cited

U.S. PATENT DOCUMENTS

| | | | |
|---|---|---|---|
| 6,757,262 B1 | 6/2004 | Weissharr et al. | |
| 7,606,813 B1 | 10/2009 | Gritsay et al. | |
| 7,664,729 B2 | 2/2010 | Klein et al. | |
| 8,229,778 B2 | 7/2012 | Keller et al. | |
| 8,428,984 B2 | 4/2013 | Xu et al. | |
| 2006/0112367 A1 | 5/2006 | Harris | |
| 2012/0066687 A1* | 3/2012 | Briscoe | H04L 41/0806 718/104 |
| 2012/0266129 A1 | 10/2012 | Massoudi et al. | |
| 2013/0124520 A1 | 5/2013 | Abrahams et al. | |

OTHER PUBLICATIONS

Ting Zhong et al.; Similarity-Based Hierarchical Structured Trust and Repputation Model in Peer-to-Peer networks; IEEE; pp. 221-225; retrieved on Sep. 26, 2022 (Year: 2010).*

(Continued)

*Primary Examiner* — S. Sough
*Assistant Examiner* — Cuong V Luu
(74) *Attorney, Agent, or Firm* — Sheridan Ross P.C.

(57) ABSTRACT

A predefined hierarchical service tree can be stored that includes a top at a service category definition level and a bottom at a level of a number of devices, each of the number of devices selected to perform a specific service function. A sequential progression can be enforced through the predefined hierarchical service tree to perform a service.

15 Claims, 6 Drawing Sheets

(56) References Cited

OTHER PUBLICATIONS

Wei Chen et al.; A Hierarchical Categorization Approach for System Operation Services; IEEE; pp. 70-707; retrieved on Sep. 26, 2022 (Year: 2017).*

International Search Report and Written Opinion, dated Jul. 31, 2014, PCT Patent Application No. PCT/US2013/067199; KIPO.

Kulkarni, N., et al., The Role of Service Granularity in a Successful SOA Realization—a Case Study, May 30, 2008 http://www cs cmu edu/~vdwivedi/papers/vdwivedi 04578356 pdf.

Overview of SOA Implementation Methodology, Aug. 1, 2008, 21 pages http://www.infoq.com/resource/articles/applied-soa/en/resources/Applied-SOA.pdf.

* cited by examiner

HIERARCHICAL SERVICE TREES

BACKGROUND

Service architecture may involve multiple discrete and/or integrated instances of hardware, firmware, and/or software application functionality for providing services. A service may be a self-contained unit of functionality, such as retrieving an online bank statement, or a service may include a combination of multiple hardware, firmware, and/or software applications to provide a complete functionality, such as an electronic mail (e-mail) service for a region.

Such service architecture may be independent of and applicable to various types of vendors, products, and/or technologies. Formulating a service agreement for a particular user may be challenging because the service architecture may utilize a mixture of various types of hardware, firmware, and/or software that perform various function to accomplish an intended service.

DETAILED DESCRIPTION

Figure 1A:
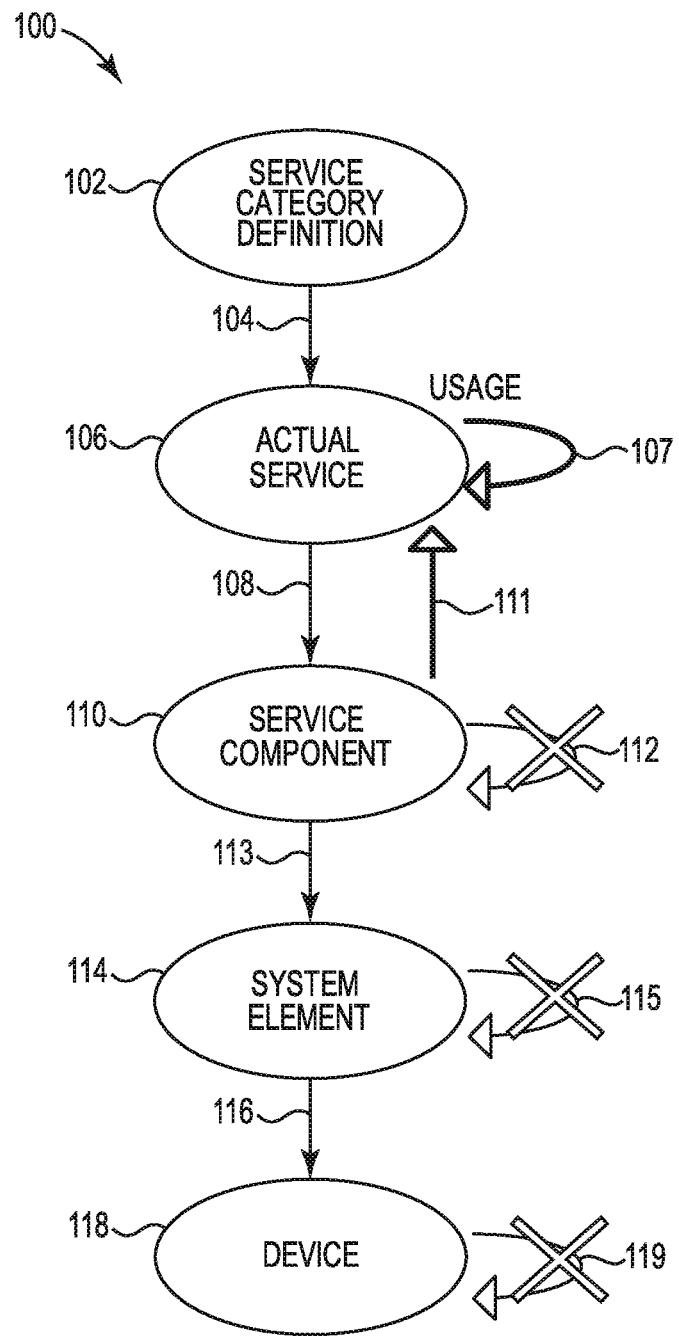
FIGS. 1A-1C illustrate examples of hierarchical service trees according to the present disclosure.

Service modeling can be conceptualized as a way to map out and/or design a number of services offered by an organization (e.g., information technology (IT) related services, among other types of services). Service modeling may be a challenge because it can involve multiple applications and/or types of applications that interact between different IT areas. For example, service modeling for a particular user (e.g., a customer, a physical and/or virtual computer device, etc.) may include interaction between configuration management, monitoring, service management, and/or a service desk, among other possible contributions to the service.

Due to a large variety of service modeling implementations provided to different users in different situations, available service modeling applications may allow free modeling without constraints pertaining to the resultant service architecture. Lack of such constraints may contribute to compatibility and/or complexlity issues, especially when trying to share a service modeling implementation between different service applications for a particular user and/or between users. An ability to engage in such free modeling enables each particular user to model the service architecture differently, which potentially may increase time and/or costs for development, integration, support, and upgrade, etc., of the service architecture.

In contrast, as described herein, a service architecture can be provided in predefined layers of a hierarchy from a service category definition that provides a general definition of a category of offered services (e.g., e-mail (Mail) services, among many others) at the top of the hierarchy and progresses through a number of predefined layers of various different components, software, etc., as described herein, down to an actual device or devices (e.g., physical and/or virtual) that provide and/or perform a particular service. Such a service architecture is described in the present disclosure as a hierarchical service tree.

Each hierarchical service tree, starting at a service category definition, is subject to enforcement of conditions for containment and/or usage, as described herein, of hardware, firmware, and/or software, etc., (e.g., instances) in the hierarchical service tree to accomplish an intended service outcome. Enforcement of such conditions in a particular hierarchical service tree and/or between different hierarchical service trees can enable documentation (e.g., being retrievably stored in an organized manner in a memory of a computing device) of the service architecture.

Documentation of the service architecture as such can effectuate simplified and/or reliable recordation and/or implementation of links for containment (e.g., dependencies) of instances in different levels of the hierarchy and/or a functional relationship (e.g., usage) of instances at the same level of the hierarchy in the same and/or different hierarchical service trees. Such documentation, along with a limited number of predefined service tree hierarchical levels (e.g., up to five levels, as described herein) can enable a particular user to be offered a service architecture (e.g., a single service architecture) with a limited number of infrastructure elements (e.g., instances) that are layered by enforcement of conditions, while maintaining a capability that crosses service categories and actual services. Because creation of the service architecture is structured by enforcement of the conditions (e.g., for containment and/or usage, etc.), customization of a service inside a particular hierarchical service tree and/or between different hierarchical service trees can be easier and/or more efficient, as the location of related data is hierarchically recorded (e.g., in contrast to free modeling that may have multiple paths to related data).

For example, as described in the present disclosure, a predefined hierarchical service tree can be stored that includes a top at a service category definition level and a bottom at a level of a number of devices, where each of the number of devices can be selected to perform a specific service function. In addition, a sequential progression (e.g., from the top to the bottom) can be enforced through the predefined hierarchical service tree to perform a service.

FIG. 1A illustrates an example of a hierarchical service tree according to the present disclosure. The hierarchical service tree 100 illustrated in FIG. 1A shows a service category definition 102 at the top level of the hierarchy. Each service category definition 102 can provide information (e.g., to a user) containing a general description of services included in a particular hierarchical service tree 100. For example, different service category definitions each may have a heading such as Web Application Services, Mail Services, Personal Computer Services, Identity Services, Build Management Services, among many other possibilities. In some examples, more information than just the heading can be provided.

The hierarchical service tree 100 can include an actual service 106 level one level below the service category definition 102 level in the hierarchy. The actual service 106 level can provide high level definitions of various types of services contained in the service category definition 102. For example, a Mail Services service category definition 102 can include the actual service 106 level having a number of headings for different services (e.g., Mail Service Production, Mail Service Staging, Mail Service New York (NY), Mail Service San Diego (SD), etc.) that are listed under the Mail Services category. Such headings both define the content of that level of the hierarchical service tree 100 and are informative to and/or selectable by a user as actual service 106 options under the Mail Services service category definition 102. For example, Mail Service NY and Mail Service SD may represent two different actual service instances. Mail Service NY may reside and/or service the New York City region and Mail Service SD may reside and/or service the San Diego region. Each of the two mail services may have different responsibilities, support teams, service level targets, service level agreements, etc.

The actual service 106 level can provide a high level definition of specific services that are offered externally (e.g., to users) and/or internally (e.g., to the service provider). The actual service 106 level also can record service level targets that define, for example, how much time is allowed for a user request to be answered and/or resolved. The actual service 106 level also can provide support groups, for example, for users and/or service providers. In some examples, the actual service 106 level also can include and/or be associated with a functionality (e.g., a Universal Configuration Management Database (UCMDB) from Hewlett Packard (HP), among other such functionalities) to provide visibility into infrastructure and/or applications of the hierarchical service tree 100. Such functionality can, for example, include software, storage, controls, etc., to manage software and/or infrastructure components, along with associated relationships (e.g., usage) and dependencies (e.g., containment). The functionality can provide infrastructure visibility that shows how components are related for consistent and reliable delivery of IT and business services. This visibility can improve and simplify control to avoid service disruptions by better tracking, management, and/or control of IT infrastructures. The just-described functions can, for example, be provided by execution of HP UCMDB software and can be included in "business service" and/or "infrastructure service" applications, among other such applications.

Containment link arrows (e.g., as shown in FIG. 1A at 104, 108, 113, and 116) depend straight dawn from levels of the hierarchical service tree 100. As described herein, "containment" indicates that an instance at one level can have a strong dependency on (e.g., is contained by) an instance in a level that is one level higher in the hierarchy. For example, because the service category definition 102 level is at the top of the hierarchical service tree 100, the service category definition 102 level has no level above it and is not dependent on any other instances. Therefore, no containment link arrow is pointing to the service category definition 102 level. In contrast, containment link arrow 104 indicates that each actual service described in the actual service 106 level (e.g., Mail Service Production, Mail Service Staging, Mail Service NY, Mail Service SD, etc.) can be dependent from (e.g., contained by) the service category definition 102 (e.g., Mail Services). Because each actual service described in the actual service 106 level is strongly associated with and can define the capability of the service category definition 102 level, the actual service 106 level and each, actual service described therein can depend from one (e.g., a single) service category definition 102 level.

As described herein, instances in a same level (e.g., Mail Service Production, Mail Service Staging, Mail Service NY Mail Service SD, etc., in the actual service 106 level) are prevented from having a containment link between these instances. That is, containment links are prevented from being recursive to the same instance or a different instance in the same level of a single hierarchical service tree 100 and/or between different hierarchical service trees.

Figure 1B:
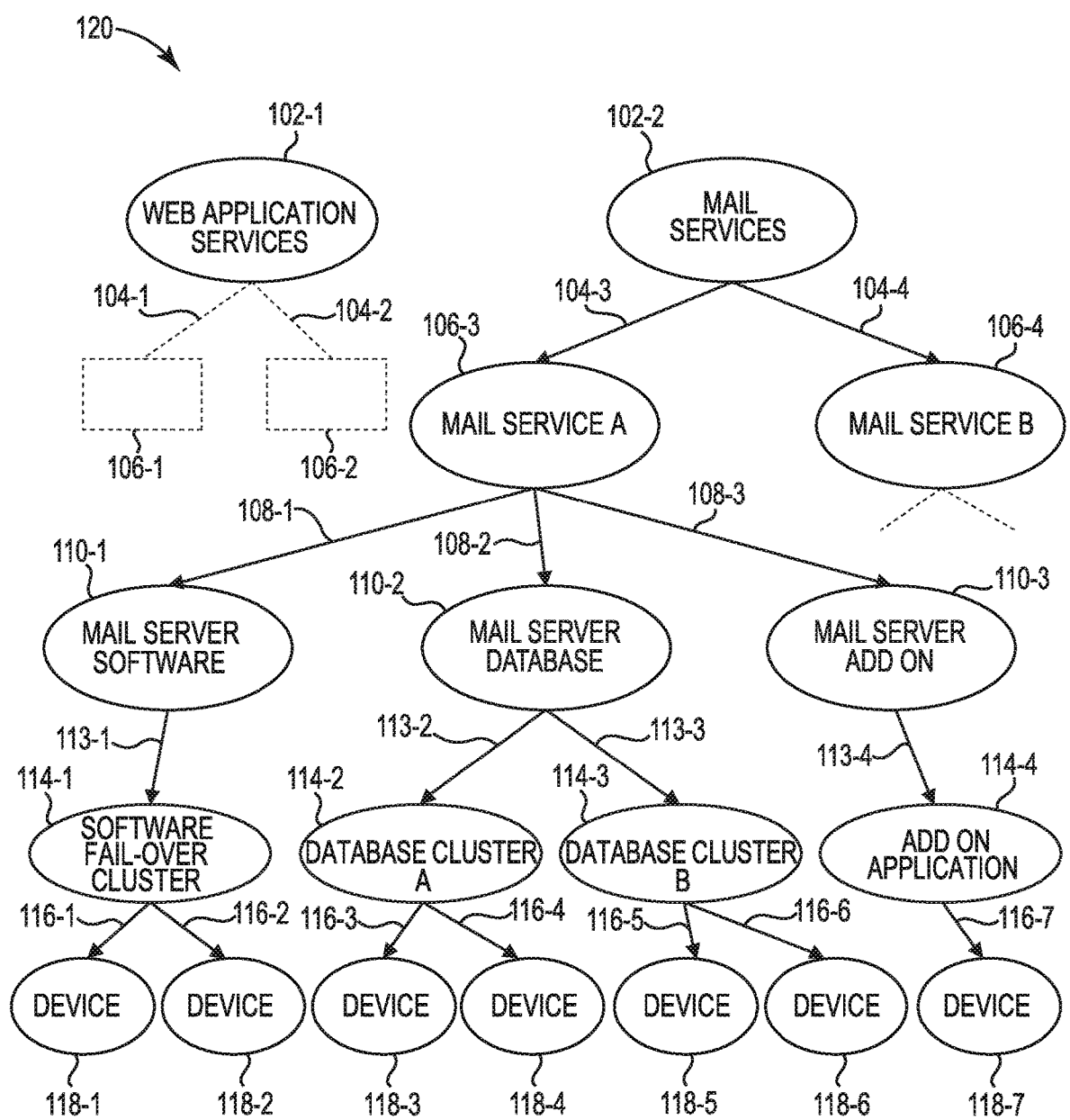
Figure 1C:
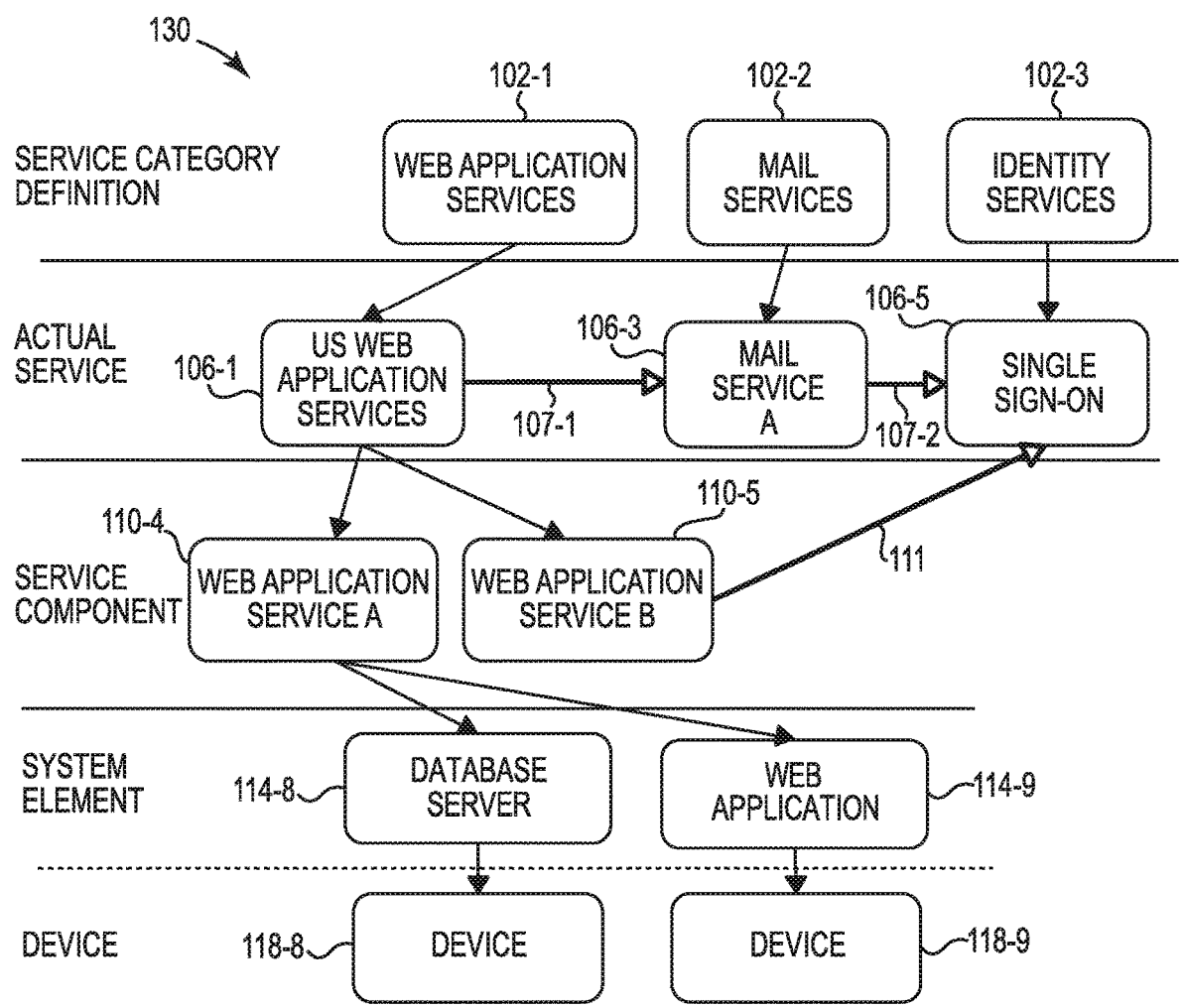

In contrast to containment links, which can only link instances in different levels of a hierarchical service tree, a usage link can be recursive to instances in a same level of a hierarchical service tree. For example, as shown in FIG. 1A, usage link 107 can be recursive to the actual service 106 level (e.g., between a plurality of different hierarchical service trees). As shown in FIGS. 1A and 1C, in contrast to containment links, enabled usage links are indicated by arrows shown in bold type with an open arrowhead. The recursive usage link 107 can enable a functional relationship between interdependent actual service instances in different hierarchical service trees. For example, as described further with regard to FIG. 1C, a particular mail service at an actual service level of a first hierarchical service tree can have a usage link to a single sign-on service at an actual service level of a second hierarchical service tree to enable the single sign-on service to be used by the particular mail service.

As shown in FIG. 1A, the hierarchical service tree 100 can, in some examples, include a service component 110 level one level below the actual service 106 level in the hierarchy. The service component 110 level can divide one or more of the instances in the actual service 106 level into a plurality of components to control implementation of the service. As shown in FIG. 1B, a particular Mail Service A 106-3 instance in the actual service 106 level can have various portions of the service controlled by different service components, such as, for example, Mail Server Software 110-1, a Mail Server Database 110-2, and a Mail Server Add On component 110-3 (e.g., as provided by components of various versions of the Microsoft Exchange® Servers, such as Application, SQL, Home Grown Add On, etc., among other sources of such components).

As described herein, each instance of a component in the service component 110 level can have a containment link 108 to a plurality of actual services in the actual service 106 level of the same hierarchical service tree 100 and/or different hierarchical service trees. As shown in FIGS. 1A and 1C, a particular instance of a service component in the service component 110 level (e.g., Web Application Service B 110-5) can have a usage link 111 to a particular actual service instance in the actual service 106 level in the hierarchy (e.g., to Single Sign-On 106-5). However, as shown in FIG. 1A by the usage link 112 not being in bold type and having a superimposed x-mark, individual instances of service components in the service component 110 level are prevented from having usage links with themselves and/or with other instances of service components in the service component 110 level of the same hierarchical service tree 100 and/or different hierarchical service trees. As such, in some examples, a usage link, as described herein, can only be connected to an actual service instance in the actual service 106 level. In various examples, the location of the plurality of components of the service component 110 level of the same hierarchical service tree 100 and/or different hierarchical service trees, along with enabled and prevented containment and usage links, can be retrievably recorded (e.g., by a "business application" of HP UCMDB, among other such applications).

As shown in FIG. 1A, the hierarchical service tree 100 can, in some examples, include a system element 114 level one level below the service component 110 level in the hierarchy. The system element 114 level can define the capability and/or redundancy of each of a number of systems offered for use to the instances of the service component 110 level to provide and/or perform a particular service. For example, capabilities of each of the physical and/or virtual devices can be defined as a description of software, firmware, and/or hardware usable on each device and/or virtualization capabilities of one or more of the devices, among other capabilities.

Redundancy capabilities defined at the system element 114 level can, as shown in FIG. 1B, include a Software Fail-Over Cluster 114-1 for when a plurality of servers service one capability (e.g., a website running on a plurality of servers for redundancy to secure performance thereof, among other implementations). The redundancy capabilities also can be defined as a Database Cluster 114-2, 114-3 for a general grouping of servers that run a database portion of an application and/or a general grouping of servers that run programmed instructions of an application (e.g., an Application Cluster, not shown). As shown in FIG. 1C, the system element level 114 can include instances of a Database Server 114-8 (e.g., a Microsoft SQL. Server, among other such applications) and instances of a Web Application Server 114-9, among other system elements. In various examples, an Add On Application 114-4, as shown in FIG. 1B, also can be used to define the capability and/or redundancy of each of a number of devices.

As described herein, each instance of a system element in the system element 114 level can have a containment link 113 to a plurality of components in the service component 110 level of the same hierarchical service tree 100 and/or different hierarchical service trees, as shown in FIG. 1B. However, as shown in FIG. 1A by the usage link 115 not being in bold type and having a superimposed x-mark, individual instances of system elements in the system element 114 level are prevented from having usage links with themselves and/or with other instances of system elements in the system element 114 level of the same hierarchical service tree 100 and/or different hierarchical service trees.

As shown in FIG. 1A, the hierarchical service tree 100 can, in some examples, include a device 118 level one level below the system element 114 level in the hierarchy. The device 118 level can represent functional links to physical and/or virtual devices that are each selectable to perform a specific service function. The devices in the device 118 level can be accessed in and/or through a number of computing resources and/or networking devices (e.g., an intranet, the internet, etc.). In some examples, the devices can represent an infrastructure of an Internet protocol (IP) based entity (e.g., that operates through a server, laptop computer, switch, etc.) As such, the devices in the device 118 level can be accessed on-site and/or in the cloud to perform a specific service function.

As described herein, each instance of a device in a device 118 level can have a containment link 116 to a plurality of components in the system element 114 level of the same hierarchical service tree 100 and/or different hierarchical service trees, as shown in FIG. 1B. A particular instance of a device in the device 118 level can only be included in a particular hierarchical service tree by creation of a containment link with a particular instance of a system element in the system element 114 level (e.g., as shown at 116-1, 116-2, . . . , 116-7 in FIG. 1B). As shown in FIG. 1A by the usage link 119 not being in bold type and having a superimposed x-mark, individual instances of devices in the device 118 level are prevented from having usage links with themselves and/or with other instances of devices in the device 118 level of the same hierarchical service tree 100 and/or different hierarchical service trees.

In various examples, the location of a plurality of devices of the device 118 level of the same hierarchical service tree 100 and/or different hierarchical service trees, along with enabled and prevented containment and usage links, can be retrievably recorded (e.g., as nodes by HP UCMDB, among other such applications). In some examples, instances in the service category definition 102 level, the actual service 106 level, and the service component 110 level can be classified as being in a system layer and instances in the system element 114 level and the device 118 level can be classified as being in an infrastructure layer.

FIG. 1B illustrates an example of containment links in a number of hierarchical service trees according to the present disclosure. The number of hierarchical service trees 120 illustrated in FIG. 1B shows a first service category definition 102-1 for Web Application Services at a top level of a first hierarchical service tree and a second service category definition 102-2 for Mail Services at a top level of a second hierarchical service tree.

The first service category definition 102-1 for Web Application Services is shown as a placeholder to indicate that a number of hierarchical service trees can be connected in a service architecture with the rest of the hierarchical service tree only being represented by containment links 104-1 and 104-2 and empty boxes to suggest a plurality of actual services 106-1 and 106-2.

An example of a complete hierarchical service tree is illustrated in FIG. 1B for the second service category definition 102-2 for Mail Services. As previously indicated, a single service category definition can have containment links to a plurality of instances of actual services in an actual service 106 level. For example, the service category definition 102-2 for Mail Services can have containment links 104-3 and 104-4 to a Mail Service A 106-3 (e.g., Mail Service NY) and to a Mail Service B 106-4 (e.g., Mail Service SD), respectively. Although containment links and the rest of a hierarchical service tree is suggested as depending from the Mail Service B 106-4, a complete example of a hierarchical service tree is only shown as depending from Mail Service A 106-3 for the purpose of clarity.

As shown in FIG. 1B, the Mail Service A 106-3 instance in the actual service 106 level can have various portions of the service controlled by different service components, such as, for example, Mail Server Software 110-1, a Mail Server Database 110-2, and a Mail Server Add On component 110-3. The different service components in the service component 110 layer are each shown in FIG. 1B as being contained by the Mail Service A 106-3 instance by containment links 108-1, 108-2, and 108-3, respectively. A Software Fail-Over Cluster 114-1 in the system element 114 level is shown as being contained by the Mail Server Software 110-1 by containment link 113-1 and Database Cluster A and Database Cluster B are each shown as being contained by the Mail Server Database 110-2 by containment link 113-2 and 113-3, respectively. An example of an Add On Application 114-4 is similarly shown as being contained by the Mail Server Add On 110-3 by containment link 113-4. Various numbers of devices 118-1, 118-2, . . . , 118-7 are shown as being contained by the system element instances 114-1, 114-2, 114-3, and 114-4 in the system element 114 level by containment links 116-1, 116-2, . . . , 116-7, respectively, to complete one hierarchical service tree for the service category definition 102-2 for Mail Services.

FIG. 1C illustrates an example of usage links in a number of hierarchical service trees according to the present disclosure. The number of hierarchical service trees 130 illustrated in FIG. 1C shows a first service category definition 102-1 for Web Application Services at a top level of a First hierarchical service tree. The first service category definition 102-1 for Web Application Services can define a number of Web application platforms that, for example, are associated with creating, maintaining, and/or updating organizational intranets, extranets, and/or websites, content management, document and/or file management, collaboration, social networks, enterprise search, business intelligence, system integration, process integration, and/or workflow automation, among other capabilities. For example, various versions of Microsoft SharePoint® can perform some or all of these functions, although the present disclosure is intended to encompass all Web Application Services applications capable of performing at least some of these functions. The number of hierarchical service trees 130 illustrated in FIG. 1C shows a second service category definition 102-2 for Mail Services at a top level of a second hierarchical service tree, and a third service category definition 102-3 for Identity Services at a top level of a third hierarchical service tree.

For the purpose of clarity, each of the three hierarchical service trees is shown with a containment link to only one instance of an actual service in the actual service 106 level, although each instance in the service category definition 102 level can contain a plurality of instances of actual services. As such, the service category definition 102-1 for Web Application Services is shown to contain only a U.S. Web Application Service 106-1 at the actual service 106 level. The U.S. Web Application Service 106-1 can, for example, describe a number of versions of SharePoint® designed to facilitate operation in the United States. The service category definition 102-2 for Mail Services is shown to contain only Mail Service A 106-3 (e.g., Mail Service NY) at the actual service 106 level. In addition, the service category definition 102-3 for Identity Services is shown to contain only Single Sign-On 106-5 at the actual service 106 level.

For the purpose of clarity, the U.S. Web Application Service 106-1 is the only instance at the actual services 106 level shown to contain instances of service components, although each instance in the actual services 106 level can contain a plurality of instances of service components. For example, the U.S. Web Application Service 106-1 can contain Web Application Service A 110-4 and Web Application Service B 110-5 in the service component 110 level. In some examples, Web Application Service A 110-4 and Web Application Service B 110-5 can be versions of SharePoint® designed to facilitate operation in the United States, although having differing capabilities for providing various services, operation in various regions, etc.

As shown by usage link 107-1 in FIG. 1C, the U.S. Web Application Service 106-1 can have a functional relationship with Mail Service A 106-3 in the actual service 106 level and, as shown by usage link 107-2, the Mail Service A 106-3 can have a functional relationship with the Single Sign-On 106-5 at the actual service 106 level. Although not shown by a usage link, U.S. Web Application Service 106-1 also can have a functional relationship with the Single Sign-On 106-5. Moreover, an instance in the service component 110 level can have a functional relationship with an instance in the actual service 106 level. For example, as shown by usage link 111, Web Application Service B 110-5 can have a functional relationship with the Single Sign-On 106-5 (e.g., all versions of SharePoint®, whether in the actual services 106 level or the service component 110 level can have a usage link to the Single Sign-On 106-5 in the actual service 106 level).

The numbers of hierarchical service trees to perform particular services and/or portions thereof, levels in the hierarchical service trees, instances in each level of the hierarchical service trees, and the numbers of and instances connected by the containment and/or usage links are illustrated in FIGS. 1A-1C by way of example and not by way of limitation. That is, in various examples, more or less of each of these items can be included in a hierarchical service tree system consistent with the present disclosure.

For example, such a system can include a hierarchical service tree with a service category definition for Build Management at the top level of the hierarchy (not shown). In various examples, a Build Management hierarchical service tree can be provided to enable oversight of, and/or assistance in, etc., building service architectures. An actual service level of the Build Management hierarchical service tree can provide high level definitions of various types of services including, for example, Business Service, Infrastructure Service, and/or Quality Control Service, among others. A Business Service may be an actual service that enables assistance to and/or input from users and/or intended users of the hierarchical service tree system. An Infrastructure Service may be an actual service that enables assistance to and/or input from management of and/or workers for (e.g. technicians in an IT unit) a provider of the hierarchical service tree system. A Quality Control Service may be an actual service that enables management of and/or workers for the provider of the hierarchical service tree system to request support (e.g., from technicians in the IT unit), request and/or connect with new users, etc. In some examples, the Infrastructure Service may be an actual service that enables provision of a service to other actual services (e.g., enables a usage link from the Quality Control Service to the Single Sign-On service 106-5 illustrated in FIG. 1C).

Figure 2:
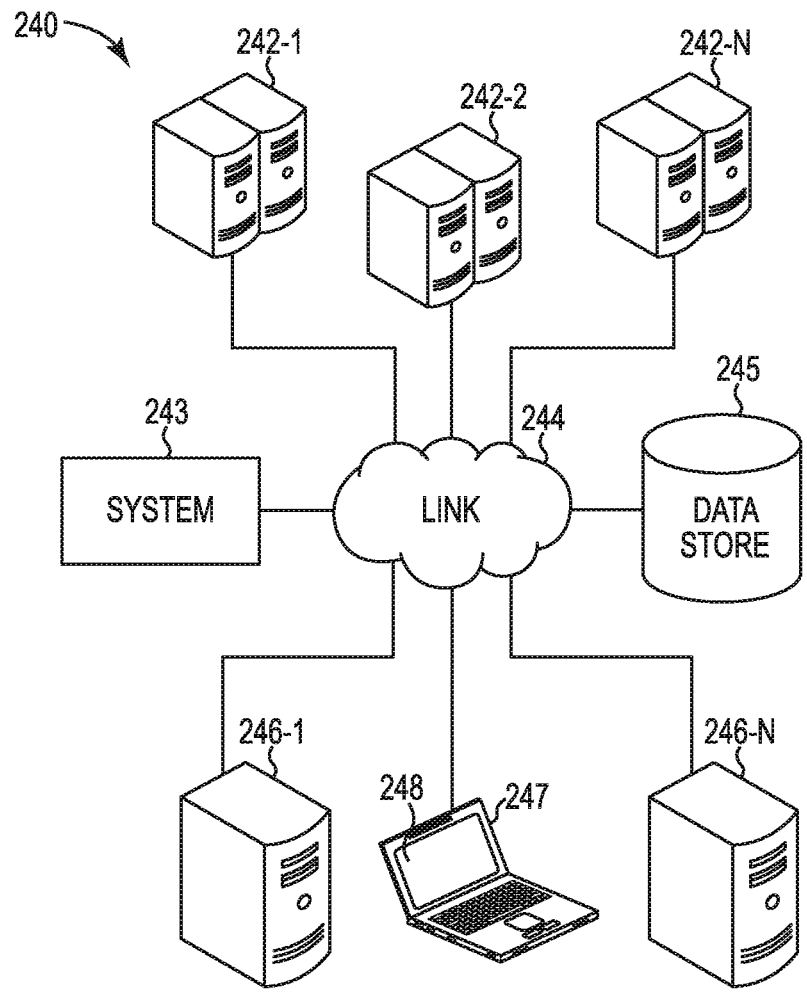
FIG. 2 illustrates a diagram of an example of an environment implementing hierarchical service trees according to the present disclosure.

FIG. 2 illustrates a diagram of an example of an environment for implementing hierarchical service trees according to the present disclosure. The environment 240 can include a system 243, a data store 245, server devices 242-1, 242-2, . . . , 242-N, and/or client devices 246-1, 246-N. The client devices 246-1, . . . , 246-N can include a client device 247 that includes a user interface 248.

The system 243, as described herein, can represent a number of different combinations of software, firmware, and/or hardware configured to implement hierarchical tree structures. The system 243 can include the computing device 360 as represented in FIG. 3B. The server devices 242-1, 242-2, . . . , 242-N each can be a computing device configured to respond to network requests received from the client devices 246-1, . . . , 246-N, 247. The client devices 246-1, . . . , 246-N, 247 can include browsers and/or other applications to communicate requests (e.g., from users, customers, etc.) to the system 243, data store 245, and/or server devices 242-1, 242-2, . . . , 242-N via a communication link 244 (e.g., local area network (LAN), intranet, extranet, internet, etc.).

Accordingly, as described in the present disclosure, a non-transitory medium (e.g., a computer-readable medium (CRM), a machine readable medium (MRM), database, etc.) can be utilized for storing instructions executable by a processing resource of the computing device. The instructions can, as in various examples described herein, be executed to store a predefined hierarchical service tree that can include a top at a service category definition level and a bottom at a level of a number of devices, each of the number of devices selected to perform a specific service function, and to enforce a sequential progression (e.g., from the top to the bottom) through the predefined hierarchical service tree to perform a service.

In some examples, the predefined hierarchical service tree can include an actual service level that defines a specific service (e.g., at least one high level definition of a specific service), the actual service level one level below the service category definition level. In some examples, the predefined hierarchical service tree can include a service component level that defines a number of components usable to perform the specific service, the service component level one level below the actual service level, In some examples, the predefined hierarchical service tree can include a system element level that defines a functionality of each of the number of devices usable by at least one of the number of components, the system element level one level below the service component level. In some examples, the predefined hierarchical service tree can include each of the number of devices being connect to the predefined hierarchical service tree through the system element level.

Figure 3A:
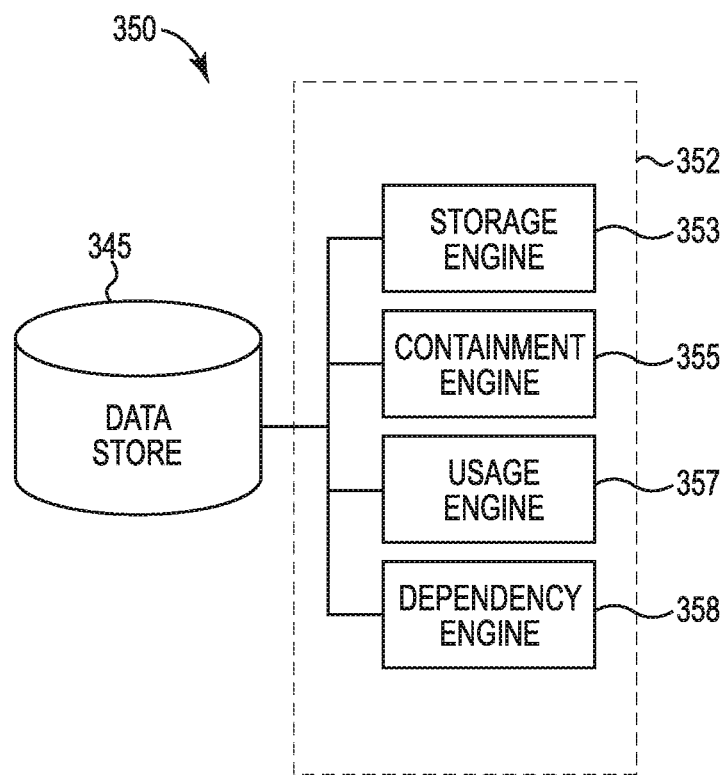
FIG. 3A illustrates a diagram of an example of a system for implementing hierarchical service trees according to the present disclosure.
Figure 3B:
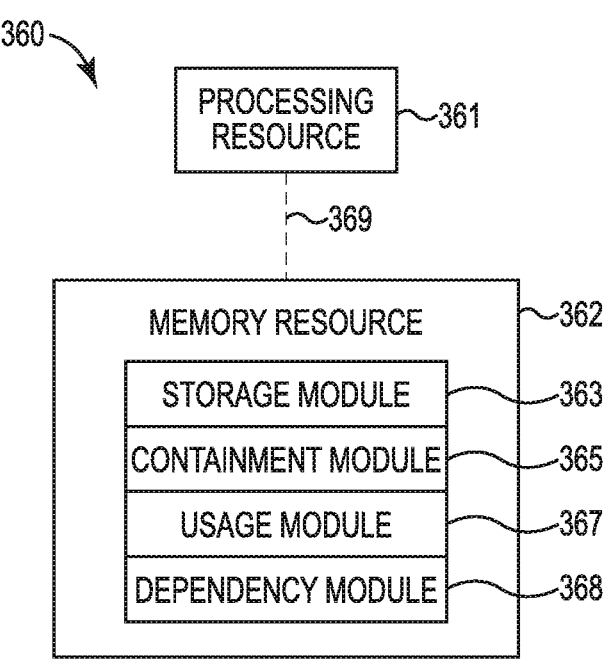
FIG. 3B illustrates a diagram of an example computing device for implementing hierarchical service trees according to the present disclosure.

FIG. 3A illustrates a diagram of an example of a system for implementing hierarchical service trees according to the present disclosure. The system 350 can include a data store 345 (e.g., data store 245 as shown in FIG. 2) operably connected to a number of engines 352 configured for implementing hierarchical service trees. The number of engines 352 can, for example, include a storage engine 353, a containment engine 355, a usage engine 357, and/or a dependency engine 358, etc. The number of engines 352 can include additional or fewer engines than illustrated to perform the various functions described herein.

The number of engines 352 can be represented as software, firmware, and/or hardware implementations. The number of engines 352 can include a combination of hardware and programming that is configured to perform a number of functions described herein. The programming can include program instructions (e.g., software, firmware, etc.) stored in a memory resource (e.g., CRM, MRM, etc.) as well as hard-wired programs (e.g., logic).

The storage engine 352 can include hardware and/or a combination of hardware and programming to structure and/or store service architectures for a number of users created through enforcement of conditions for hierarchical service trees, as described herein (e.g., progression though the hierarchical levels of hierarchical service trees). The containment engine 355 can include hardware and/or a combination of hardware and programming to determine and/or provide containment links through enforcement of conditions for hierarchical service trees, as described herein (e.g., only providing containment links between instances in different levels of a single hierarchical service tree and/or different hierarchical service trees). The usage engine 357 can include hardware and/or a combination of hardware and programming to determine and/or provide usage links through enforcement of conditions for hierarchical service trees, as described herein (e.g., only providing usage links connected to instances in an actual service level of a single hierarchical service tree and/or between different hierarchical service trees).

The dependency engine 358 can include hardware and/or a combination of hardware and programming to track locations, dependencies, and/or usages of various instances in various levels of a single hierarchical service tree and/or between different hierarchical service trees to facilitate storage, retrieval, and/or implementation of the hierarchical service trees. In some examples, one or more of these engines can be implemented by execution of HP UCMDB software.

FIG. 3B illustrates a diagram of an example computing device for implementing hierarchical service trees according to the present disclosure. The computing device 360 can utilize software, hardware, firmware, and/or logic to perform a number or the functions described herein. The computing device 360 can be any combination of hardware and program instructions configured to share information. The hardware, for example can include a processing resource 361 and/or a memory resource 362 (e.g., CRM, MRM, database, etc.) A processing resource 361, as used herein, can include any number of processors capable of executing instructions stored by a memory resource 362. The processing resource 361 may be integrated in a single device or distributed across a plurality of devices. Program instructions (e.g., computer-readable instructions (CRI), machine readable instructions (MRI), etc.) can include instructions stored on the memory resource 362 and executable by the processing resource 361 to implement a desired function (e.g., implementation of a number of hierarchical service trees to perform an intended service).

The memory resource 362 can be in communication with the processing resource 361 via a communication link (e.g., path) 369. The memory resource 362 can include any number of memory components capable of storing instructions that can be executed by the processing resource 361. Such a memory resource 362 can be a non-transitory CRM or MRM. Memory resource 362 may be integrated in a single device or distributed across a plurality of devices. Further, memory resource 362 may be fully or partially integrated in the same device as processing resource 361 or it may be separate but accessible to that device and the processing resource 361. Thus, it is noted that the computing device 360 may be implemented on a participant device, on a server device, on a collection of server devices, and/or on any combination of user devices, provider devices, and/or server devices.

The communication link 369 can be local or remote to a machine (e.g., a computing device) associated with the processing resource 361. Examples of a local communication link 369 can include an electronic bus internal to a machine (e.g., a computing device) where the memory resource 362 is one or more of volatile, non-volatile, fixed, and/or removable storage media in communication with the processing resource 361 via the electronic bus. Alternatively or in addition, at least some of the memory resource 362 and/or the processing resource 361 can be accessed (e.g., by a browser) in the cloud.

A number of modules 363, 365, 367, 368 can include instructions (e.g., CRI, MRI, etc.) that when executed by the processing resource 361 can perform a number of functions. The number of modules 363, 365, 367, 368 can be sub-modules of other modules. For example, a containment module 365 and a usage module 367 can be sub-modules and/or contained within the same computing device. In another example, the number of modules 363, 365, 367, 368 can include individual modules at separate and distinct locations (e.g., CRM, MRM, etc.).

Each of the number of modules 363, 365, 367, 368 can include instructions that when executed by the processing resource 361 can function as a corresponding engine, as described herein with regard to FIG. 3A. For example, the storage module 363 can include instructions that when executed by the processing resource 361 can function as the storage engine 353 in other examples, when executed by the processing resource 361, the containment module 365 can include instructions that can function as the containment engine 355, the usage module 367 can include instructions that can function as the usage engine 357, and/or the dependency module 368 can include instructions that can function as the dependency engine 358.

Accordingly, a system to provide hierarchical service trees can include a processing resource in communication with a non-transitory medium (e.g., CRM, MRM, database, etc.) having instructions executed by the processing resource. The instructions can, as in various examples described herein, be executed to implement storage of a number of predefined hierarchical service trees that each includes a top at a service category definition level and a bottom at a level of a number of devices, storage of a number of actual services at an actual services level one level below the service category definition level, where each actual service defines a specific service, and storage of a number of service components at a service component level one level below the actual services level, where each service component defines a number of components usable to perform a specific service. The instructions can, as in various examples described herein, be executed to implement a containment engine to restrict at least one actual service to containment in a (e.g., a single) service category definition and to enable at least one service component to containment in a first actual service in a first predefined hierarchical service tree and a second actual service in a second predefined hierarchical service tree.

As in various examples described herein, the instructions can be executed to implement a usage engine to allow at least one usage link between the first actual service and the second actual service and/or to allow a usage link from a service component to at least one actual service. The instructions can, in some examples, be executed to implement a dependency engine to track containment and/or usage link dependencies in the first predefined hierarchical service tree and/or to track containment and/or usage link dependencies between the first predefined hierarchical service tree and the second predefined hierarchical service tree.

Figure 4:
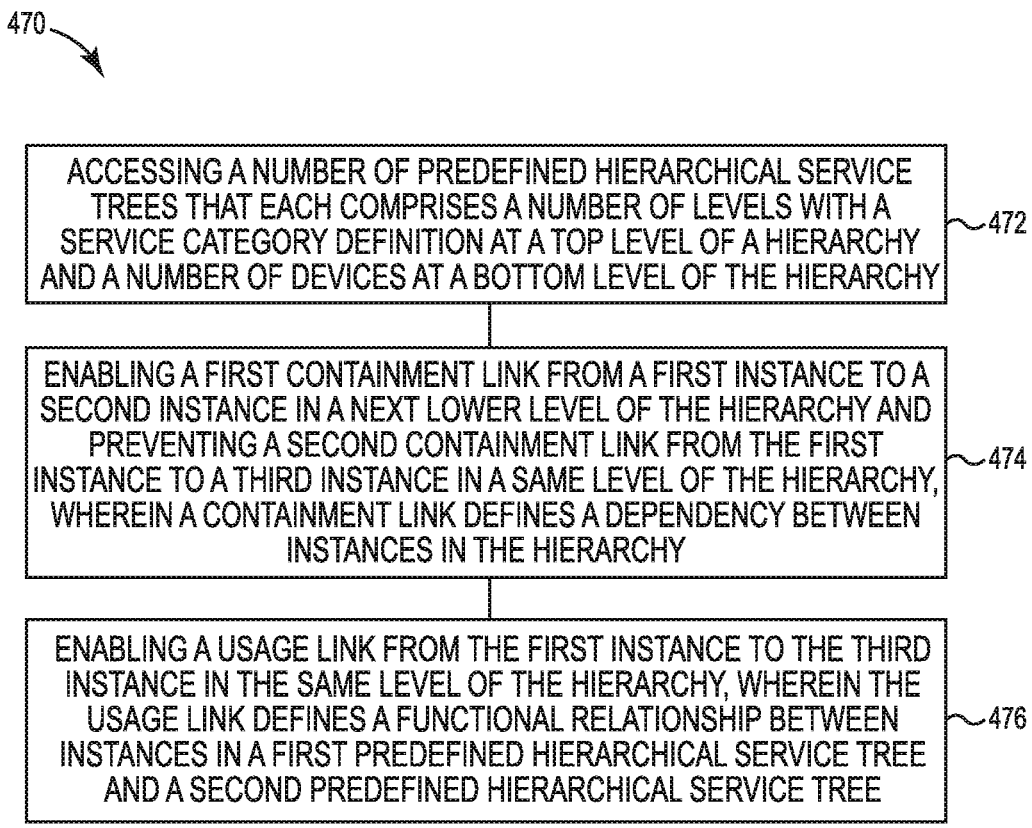
FIG. 4 illustrates a flow diagram of an example method for implementing hierarchical service trees according to the present disclosure.

FIG. 4 illustrates a flow diagram of an example method for implementing hierarchical service trees according to the present disclosure. Unless explicitly stated, the method examples described herein are not constrained to a particular order or sequence. Additionally, some of the described method examples, or elements thereof, can be performed at the same, or substantially the same, point in time. As described herein, the actions, functions, calculations, data manipulations and/or storage, etc., can be performed by execution of non-transitory machine readable instructions stored in a number of memories (e.g., software, firmware, and/or hardware, etc.) of a number of applications. As such, a number of computing resources with a number of interfaces (e.g., user interfaces) can be utilized for implementing hierarchical service trees (e.g., via accessing a number of computing resources via the user interfaces).

The present disclosure describes a method 470 for implementing hierarchical service trees that utilizes a processing resource to execute instructions stored on a non-transitory medium. The method can include, as shown at 472 in FIG. 4, accessing a number of predefined (e.g., predetermined and stored) hierarchical service trees that each includes a number of levels with a service category definition 102 at a top level of a hierarchy and a number of devices 118 at a bottom level of the hierarchy. As shown at 474, the method can include enabling a first containment link from a first instance to a second instance in a next lower level of the hierarchy (e.g., the containment link 108-1 from Mail Service A 106-3 to Mail Server Software 110-1 in FIG. 1B) and preventing a second containment link from the first instance to a third instance in a same level of the hierarchy, or vice versa (e.g., a containment link is prevented between U.S. Web Application Services 106-1 and Mail Service A 106-3 in FIG. 1C), where a containment link defines a dependency between instances in the hierarchy.

As shown at 476, the method can include enabling a usage link from the first instance to the third instance in the same level of the hierarchy (e.g., a usage link 107-1 from U.S. Web Application Services 106-1 to Mail Service A 106-3 in FIG. 1C), where the usage link defines a functional relationship between instances in a first predefined hierarchical service tree and a second predefined hierarchical service tree. Some examples can include storing an actual service level one level below the service category definition level, the actual service level defining specific services, where the same level of the hierarchy is the actual service level. For example, a usage link can be enabled between instances in the actual service 106 level and a usage link can be prevented between instances that are both in another level (e.g., instances both being in the service category definition 102, the service component 110, the system element 114, or the device 118 levels).

Some examples can include enabling a service component 110 level stored one level below the actual service 106 level to have a number of containment links 113 from instances therein to instances in a system element 114 level and to have a number of usage links 111 to instances in the actual service 106 level, the service component level defining a number of components usable to perform the specific service, in contrast, in some examples, usage links can be prevented between instances in other levels (e.g., between the service category definition 102 level and the actual service 106 level, from the actual service 106 level to the service component 110 level, between the service component 110 level and the system element 114 level, or between the system element 114 level and the device 118 level, etc.), where such usage links are prevented from defining a functional relationship between instances in a first predefined hierarchical service tree end a second predefined hierarchical service tree.

Some examples can include enabling the system element 114 level stored one level below the service component 110 level to have a number of containment links 116 to the number of devices 118 at the bottom level of the hierarchy, the system element level defining a functionality of each of the number of devices. As such, a service can be designed (e.g., for a provider, user, customer, etc.) to use the enabled containment links and/or the enabled usage links to enforce a progression through each level of at least one predefined hierarchical service tree.

A number of service architectures have utilized a free graph model that may allow connecting without restriction any instance to another instance, including recursion to the same instance and/or the same type of instance. Such an unrestricted architecture may involve customers spending time and/or effort in trying to understand and/or develop an appropriate way to structure the service architecture, which may result in each customer structuring their service architecture differently. This may increase costs to the customer for structuring the service. When each customer models their service differently, it can be difficult for a provider to support each one, as it may increase a need for IT training and/or may involve more use cases to support, which may increase the provider's costs for support, integration, development, and/or upgrade of the service architecture.

In contrast, utilizing the predefined hierarchical service trees described herein may provide a number of benefits. Utilizing the predefined hierarchical service trees may lower support costs by, for example, providing a defined service structure that enables easier integration with other products (e.g., computer applications, etc.), lowering user interface development costs and/or upgrade costs (e.g., because strictly enforced hierarchical service trees may be simpler than and/or may involve less use cases than free graph structures). Utilizing the predefined hierarchical service trees may provide users with a more efficient way of structuring the service architecture because a user would not be provided with an unlimited number of possibilities from which to choose (e.g., as in a free graph model). Utilizing the predefined hierarchical service trees also may make it more efficient for a user to customize behavior of service architecture because the locations of related data, service functions, dependencies, containments, usages, etc., may be easily found (e.g., by the storage, containment, usage, and/or engines) in order to be revised.

As used herein, "a", "at least one", or "a number of" an element can refer to one or more of such elements. For example, "a number of predefined hierarchical service trees" can refer to one or more predefined hierarchical service trees. Further, where appropriate, as used herein, "for example" and "by way of example" should be understood as abbreviations for "by way of example and not by way of limitation".

The figures herein follow a numbering convention in which the first digit or digits correspond to the figure number and the remaining digits identify an element or component in the drawing. Similar elements or components between different figures may be identified by the use of similar digits. For example, 114 may reference element "14" in FIG. 1, and a similar element may be referenced as 214 in FIG. 2. Elements shown in the various figures herein may be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense.

As described herein, plurality of storage volumes can include volatile and/or non-volatile storage (e.g., memory). Volatile storage can include storage that depends upon power to store information, such as various types of dynamic random access memory (DRAM), among others. Non-volatile storage can include storage that does not depend upon power to store information. Examples of non-volatile storage can include solid state media such as flash memory, electrically erasable programmable read-only memory (EEPROM), phase change random access memory (PCRAM), magnetic storage such as a hard disk, tape drives, floppy disk, and/or tape storage, optical discs, digital versatile discs (DVD), Blu-ray discs (BD), compact discs (CD), and/or a solid state drive (SSD), etc., as well as other types of machine readable media.

As used herein, "logic" is an alternative or additional processing resource to execute the actions and/or functions, etc., described herein, which includes hardware (e.g. various forms of transistor logic, application specific integrated circuits (ASICs), etc.), as opposed to computer executable instructions (e.g., software, firmware, etc.) stored in memory and executable by a processor.

It is to be understood that the descriptions presented herein have been made in an illustrative manner and not a restrictive manner. Although specific examples systems, machine readable media, methods and instructions, for example, for predefined hierarchical service trees, have been illustrated and described herein, other equivalent component arrangements, instructions, and/or device logic can be substituted for the specific examples presented herein without departing from the spirit and scope of the present disclosure.

What is claimed:

1. A non-transitory machine-readable medium storing instructions executable by a processing resource to:
   store a predefined hierarchical service tree, wherein the predefined hierarchical service tree comprises a top level containing descriptions of a plurality of general service categories associated with the predefined hierarchical service tree, a second level below the top level containing a description of a specific service for each general service category of the plurality of general service categories, and a bottom level below the second level containing links to devices to perform specific service functions; and
   enforce a sequential progression through the predefined hierarchical service tree to perform a given specific service.

2. The medium of claim 1, wherein the second level is one level below the top level.

3. The medium of claim 2, wherein the predefined hierarchical service tree further comprises a service component level one level below the second level, wherein the service component level defines a number of components useable to perform the given specific service.

4. The medium of claim 3, wherein the predefined hierarchical service tree further comprises a system element level below the service component level and above the bottom level, wherein the system element level defines at least one capability or a redundancy of a system to use in the given specific service.

5. The medium of claim 1, wherein the predefined hierarchical service tree further comprises a device level corresponding to the bottom level, and the device level represents functional links to the devices to perform selected functions.

6. A system comprising:
   a processor; and
   a memory storing instructions that, when executed by the processor, cause the processor to:
      access data representing a first predefined hierarchical service tree and containment links representing a sequential progression through the first predefined hierarchical service tree to perform a first service, wherein the first predefined hierarchical service tree comprises a plurality of hierarchical levels comprising a top level containing descriptions of a plurality of general service categories associated with the first predefined hierarchical service tree, a second level below the top level containing a description of a plurality of actual services for each general service category of the plurality of general service categories including a description of the first service, and a bottom level below the second level containing links to devices to perform specific service functions; and
      based on the containment links, enforce a sequential progression through the first predefined hierarchical service tree to perform the first service.

7. The system of claim 6, wherein the instructions, when executed by the processor, further cause the processor to perform the first service using an instance associated with a second predefined hierarchical service tree based on a usage link.

8. The system of claim 7, wherein the usage link represents a functional relationship between the instance and another instance associated with the first predefined hierarchical service tree.

9. The system of claim 6, wherein the instructions, when executed by the processor, further cause the processor to track containment and usage link dependencies in the first predefined hierarchical service tree.

10. The system of claim 6, wherein the instructions, when executed by the processor, further cause the processor to track containment and usage link dependencies between the first predefined hierarchical service tree and a second predefined hierarchical service tree.

11. A method comprising:

storing a predefined hierarchical service tree, wherein the predefined hierarchical service tree comprises a top level containing descriptions of a plurality of general service categories associated with the predefined hierarchical service tree, a second level below the top level containing a description of a specific service for each general service category of the plurality of general service categories, and a bottom level below the second level containing links to devices to perform specific service functions; and enforcing a sequential progression through the predefined hierarchical service tree to perform a given specific service.

12. The method of claim 11, wherein the second level is one level below the top level.

13. The method of claim 12, wherein the predefined hierarchical service tree further comprises a service component level one level below the second level, wherein the service component level defines a number of components useable to perform the given specific service.

14. The method of claim 13, wherein the predefined hierarchical service tree further comprises a system element level below the service component level and above the bottom level, wherein the system element level defines at least one capability or a redundancy of a system to use in the given specific service.

15. The method of claim 11, wherein the predefined hierarchical service tree further comprises a device level corresponding to the bottom level, and the device level represents functional links to the devices to perform selected functions.

* * * * *